(12) United States Patent
Nagata et al.

(10) Patent No.: US 11,270,118 B2
(45) Date of Patent: Mar. 8, 2022

(54) CREATING A VALUABLE VIDEO CLIP USING METADATA FLAGGING

(71) Applicant: Toyota Motor Engineering & Manufacturing North America, Inc., Plano, TX (US)

(72) Inventors: Katsumi Nagata, Foster City, CA (US); Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/846,070

(22) Filed: Apr. 10, 2020

(65) Prior Publication Data

US 2021/0319223 A1    Oct. 14, 2021

(51) Int. Cl.
*G06K 9/00* (2006.01)
*G06F 16/75* (2019.01)
*G06F 16/783* (2019.01)

(52) U.S. Cl.
CPC .......... *G06K 9/00711* (2013.01); *G06F 16/75* (2019.01); *G06F 16/7837* (2019.01); *G06K 9/00771* (2013.01); *G06K 9/00791* (2013.01); *G06K 2009/00738* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 7,737,837 B2 | 6/2010 | Donovan et al. |
| 7,986,339 B2 | 7/2011 | Higgins |
| 8,588,041 B1 | 11/2013 | Schillinger, Jr. |
| 8,612,170 B2 | 12/2013 | Smith et al. |
| 8,836,784 B2 | 9/2014 | Erhardt et al. |
| 9,201,842 B2 | 12/2015 | Plante |
| 9,412,268 B2 | 8/2016 | Saptharishi et al. |
| 9,472,104 B2 | 10/2016 | Hyde et al. |
| 9,491,420 B2 | 11/2016 | Mimar |
| 9,836,716 B2 | 12/2017 | Gunderson et al. |

(Continued)

OTHER PUBLICATIONS

Accident Detection System using Image Processing and MDR, IJCSNS, vol. 7 No. 3, Mar. 2007, Yong-Kul Ki.

(Continued)

*Primary Examiner* — Talha M Nawaz
(74) *Attorney, Agent, or Firm* — Snell & Wilmer LLP

(57) ABSTRACT

Methods, systems, devices and apparatuses for a video surveillance system. The video surveillance system includes a camera configured to detect first image data. The video surveillance system includes a memory. The memory is configured to store the first image data. The video surveillance system includes a processor. The processor is coupled to the camera and the memory and configured to identify one or more objects within the first image data. The processor is configured to generate metadata associated with the one or more objects within the first image data. The processor is configured to tag the metadata to the one or more objects within the first image data. The processor is configured to generate second image data that is a subset of the first image data based on the metadata tagged to the one or more objects.

18 Claims, 5 Drawing Sheets

(56) References Cited

U.S. PATENT DOCUMENTS

| | | | |
|---|---|---|---|
| 2006/0077256 A1 | 4/2006 | Silvemail et al. | |
| 2013/0108239 A1* | 5/2013 | Ryer | H04N 21/8456 |
| | | | 386/241 |
| 2013/0208124 A1* | 8/2013 | Boghossian | G06K 9/3241 |
| | | | 348/159 |
| 2013/0322687 A1* | 12/2013 | Kritt | G06T 11/00 |
| | | | 382/103 |
| 2017/0017734 A1 | 1/2017 | Groh et al. | |
| 2017/0300757 A1* | 10/2017 | Wolf | G06T 7/90 |
| 2019/0197887 A1 | 6/2019 | Modi et al. | |
| 2020/0089962 A1* | 3/2020 | Narang | G06T 7/11 |

OTHER PUBLICATIONS

The Color Identification of Automobiles for Video Surveillance, Wang et al.

* cited by examiner

CREATING A VALUABLE VIDEO CLIP USING METADATA FLAGGING

BACKGROUND

Field

This disclosure relates to a system, method, apparatus and/or device to provide video clips of the most relevant information of an event to a user.

Description of the Related Art

Current video surveillance systems continuously record video when an object is detected within its field-of-view. These video surveillance systems observe from a distance to monitor behavior and/or activities and continuously record the video. This consumes numerous resources to store the video and may result in duplicative processes to continuously detect and identify the object of interest in the video. Moreover, these video surveillance systems do not keep track of metadata of the object, such as the color, type or other characteristics of the object, which may be used to identify valuable information within the video for further investigation. These video surveillance systems continuously record the video without determining the most relevant aspects of the video.

Accordingly, there is a need for a system, apparatus and/or method to prioritize objects or other information within video to identify meaningful objects and events in the video.

SUMMARY

In general, one aspect of the subject matter described in this disclosure may be embodied in a video surveillance system. The video surveillance system includes a camera configured to detect first image data. The video surveillance system includes a memory. The memory is configured to store the first image data. The video surveillance system includes a processor. The processor is coupled to the camera and the memory and configured to identify one or more objects within the first image data. The processor is configured to generate metadata associated with the one or more objects within the first image data. The processor is configured to tag the metadata to the one or more objects within the first image data. The processor is configured to generate second image data that is a subset of the first image data based on the metadata tagged to the one or more objects.

These and other embodiments may optionally include one or more of the following features. The processor may be configured to provide the second image data to a user device. The second image data may have a length that is shorter than a length of the first image data and/or a smaller data size than the first image data. The processor may be configured to reduce a resolution of the second image data to a resolution less than the first image data. The processor may be configured to prioritize the metadata associated with the one or more objects. The processor may be configured generate the second image data based on the prioritization of the metadata associated with the one or more objects. The processor may be configured to categorize the metadata associated with the one or more objects. There may be multiple categories that the metadata may be categorized into.

The processor may weight each category and may prioritize the metadata using the weight of the category of the metadata. The processor may be configured to determine a level of confidence for the metadata for each of the one or more objects. The processor may be configured to prioritize the metadata based on the level of confidence for the metadata for each of the one or more objects. The processor may be configured to detect or determine that there is a triggering event. The processor may be configured to generate the second image data in response to the triggering event.

In another aspect, the subject matter may be embodied in a video surveillance system for a vehicle. The video surveillance system includes a camera configured to detect first image data. The video surveillance system includes a sensor configured to detect a triggering event. The video surveillance system includes a memory coupled to the camera and the sensor. The memory is configured to store the first image data. The video surveillance system includes an electronic control unit. The electronic control unit is coupled to the camera and the memory. The electronic control unit is configured to identify one or more objects within the first image data. The electronic control unit is configured to generate metadata associated with the one or more objects within the first image data. The electronic control unit is configured to tag the metadata to the one or more objects within the first image data. The electronic control unit is configured to generate second image data that is a subset of the first image data based on the metadata tagged to the one or more objects and in response to a triggering event.

In another aspect, the subject matter may be embodied in a method for video surveillance. The method includes capturing, using a camera, first image data of an environment surrounding a vehicle. The method includes identifying, by a processor, one or more objects within the first image data. The method includes generating, by the processor, metadata associated with the one or more objects within the first image data. The method includes tagging, by the processor, the metadata associated with the one or more objects within the first image data. The method includes generating, by the processor, second image data that is a subset of the first image data based on the metadata tagged to the one or more objects.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for prioritizing and identifying important objects within video using metadata. The prioritization and identification of objects may be used in a video surveillance system or other multimedia capture system, such as to generate trailers, video clips or media highlights that summarize relevant media within a lengthier media stream. The video surveillance system captures image data including video. The video surveillance system may also capture audio data that corresponds with the image data. The video surveillance system tags the captured image data with metadata. The metadata identifies various attributes or characteristics of the objects within the image data, such as a color, type, model or other identifier. The video surveillance system may use the tags to prioritize the importance of the objects and/or metadata to determine a portion of the image data, such as a video clip, to send to a user or other third-party. This minimizes or reduces the amount of image data that must be sent to the user and/or the amount of image data that is stored, and thus, reduces the consumption of computing resources.

Other benefits and advantages include the capability to prioritize the metadata within the image data. This allows the video surveillance system to target the most important objects within the image data, and so, the video surveillance system identifies the most relevant target of the image data when recording data.

Figure 1:
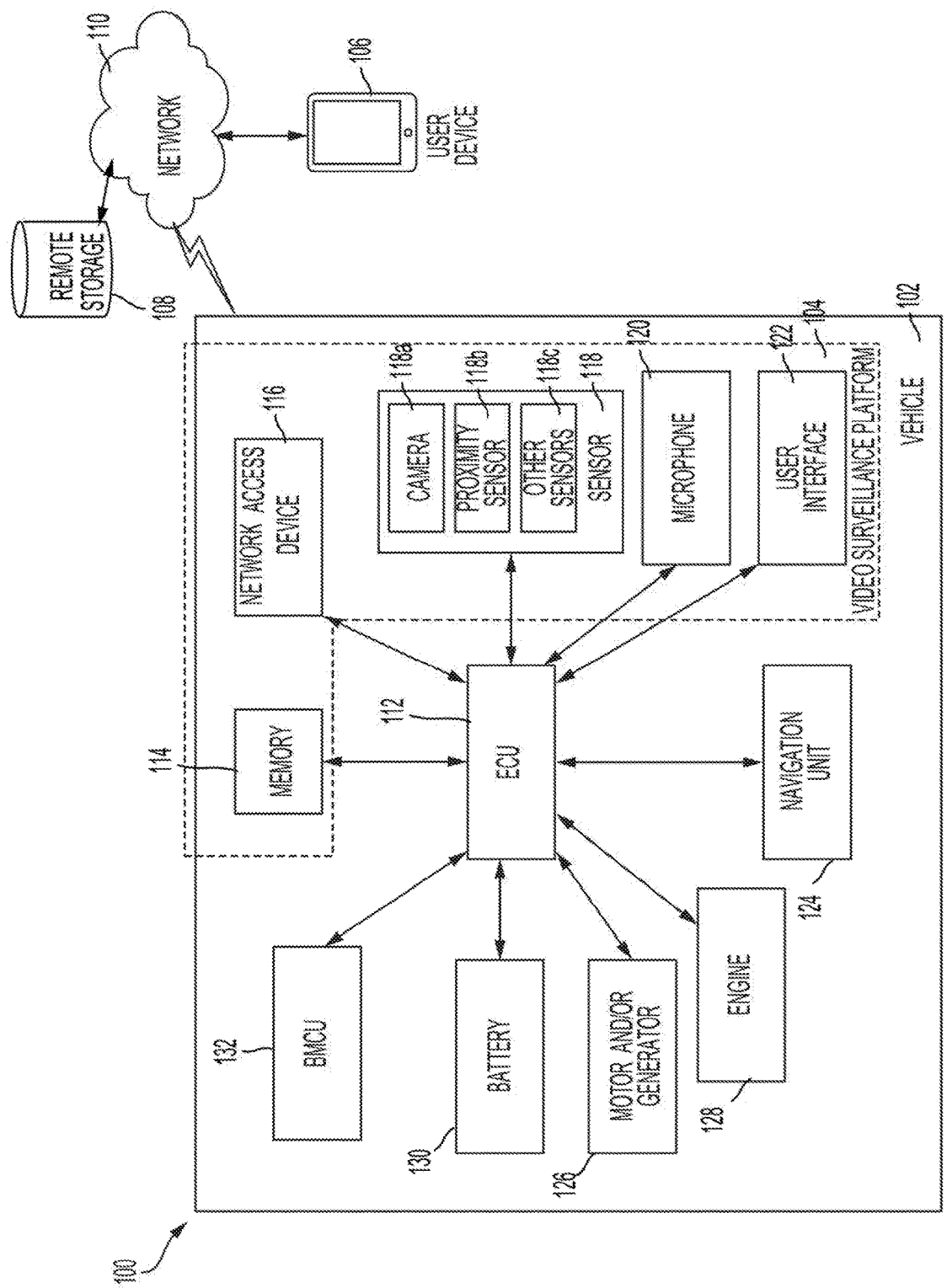
FIG. 1 is a block diagram of an example video surveillance system integrated within a vehicle according to an aspect of the invention.

FIG. 1 is a block diagram of a video surveillance system 100. The video surveillance system 100 may have a video surveillance platform 104, which may be retro-fitted, coupled to, integrated with, include or be included within a vehicle 102 or may be entirely separate from the vehicle 102. The video surveillance system 100 may include or be coupled to a user device 106 and/or a remote storage 108. The user device 106 may be a personal device, a mobile device, such as a smartphone, a tablet other electronic device that may be display notifications, run applications or otherwise interact with the vehicle 102 and/or the video surveillance platform 104 via a wireless or a wired connection. The user device 106 may belong to the driver or owner of the vehicle 102 and/or a third-party.

The video surveillance system 100 may have or use a network 110 to communicate among different components, such as between the vehicle 102, the user device 106 and/or the remote storage 108. The network 110 may be a Dedicated Short-Range Communication (DSRC) network, a local area network (LAN), a wide area network (WAN), a cellular network, the Internet, or combination thereof, that connects, couples and/or otherwise communicates among the different components of the video surveillance system 100.

The video surveillance system 100 may include or be coupled to the remote storage 108. The remote storage 108 may be a cloud server or a database. A server may be a computer in a network that is used to provide services, such as accessing files or sharing peripherals, to other computers in the network. A database is any collection of pieces of information that is organized for search and retrieval, such as by a computer, and the database may be organized in tables, schemas, queries, reports, or any other data structures. The database may use any number of database management systems. The remote storage 108 may receive the captured image data, such as a video, and/or a portion or subset of the captured image data, such as a video clip, to store the image data or a portion thereof. This allows the user to capture additional image data for post-processing.

The video surveillance platform 104 buffers or captures image data of the environment surrounding the vehicle 102 and tags or labels the image data using metadata. The video surveillance platform 104 identifies objects within the image data and tags or labels the objects using metadata. The metadata describes various attributes or characteristics of the corresponding object. For example, the video surveillance platform 104 may identify another vehicle surrounding the vehicle 102 within the image data and may tag or label metadata that indicates the color, the type, the make, the model, the license plate number (LPN) or other attribute, feature or characteristic related to the surrounding vehicle. The video surveillance platform 104 detects a triggering event and may record or store the buffered video. The video surveillance platform 104 may generate a reduced video clip of the stored or recorded video using the metadata to identify the important objects and/or actions within the stored or recorded video to send to a user device 106. The reduced video clip may be a video clip that is reduced in length, such as shortened video clip, reduced in quality, such as at a reduced resolution, reduced in size, such as a compressed video clip, or otherwise reduced. By filtering out the meaningful events and objects within the stored and/or recorded video, the user is provided with an abbreviated video clip of the most important portion of the captured image data, which reduces the amount of storage resources necessary and highlights the most important aspects of the event.

The video surveillance platform 104 includes an electronic control unit 112 or other processor, a memory 114, a network access device 116 and/or one or more sensors 118. The video surveillance platform 104 may include a microphone 120 and/or a user interface 122. The video surveillance platform 104 may include or be coupled to one or more components of the vehicle 102, such as the navigation unit 124 or one or more other components of the vehicle 102, such as the motor and/or generator 126, the engine 128, the battery 130, and/or the battery management and control unit (BMCU) 132.

A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The video surveillance platform 104 includes or couples to one or more processors, such as the electronic control unit (ECU) 112. The one or more processors, such as the ECU 112, may be implemented as a single processor or as multiple processors. For example, the ECU 112 may be a microprocessor, data processor, microcontroller or other controller, and may be electrically coupled to some or all the other components within the vehicle 102. The one or more processors may capture and analyze image data, prioritize objects within the image data, detect a triggering event and generate clips or portions of the image data to provide to a user device 106. The ECU 112 may be coupled to the memory 114.

The video surveillance platform 104 has a memory 114. The memory 114 may be coupled to the ECU 112 and store instructions that the ECU 112 executes. The memory 114 may include one or more of a Random Access Memory (RAM), a Read Only Memory (ROM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 114 may store user configuration settings that identify the amount to buffer the image data or other multimedia or media data, the duration before and after a triggering event to capture the image data or other multimedia or media data and/or the various types of metadata to tag or label one or more objects within the image data, audio data or other multimedia or media data. Hereinafter, media data may include either image data, such as video, and/or audio data, such as audio, or a combination of both the image data and the audio data.

The video surveillance platform 104 includes a network access device 116. The network access device 116 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 116 may transmit data to and receive data from the different components of the different entities of the video surveillance system 100, such as the user device 106, the video surveillance platform 104, the vehicle 102, and/or the remote storage 108.

The video surveillance platform 104 may include a user interface 122. The user interface 122 may include an input/output device that receives user input from a user interface element, a button, a dial, a microphone, a keyboard, or a touch screen. The user interface 122 may provide an output to an output device, such as a display, a speaker, an audio and/or visual indicator, or a refreshable braille display. The user input may include one or more configuration settings for the video surveillance platform 104.

The video surveillance platform 104 includes one or more sensors 118. The one or more sensors 118 may include a camera 118a, a proximity sensor 118b and/or other sensors 118c. The camera 118a may capture image data of the surrounding environment, which may be processed or analyzed to determine or recognize objects within the surrounding environment of the vehicle 102. The camera 118a may capture image data of the environment within the vehicle 102. The image data may also be processed or analyzed to determine features, characteristics or attributes of the objects, which may then be tagged or labelled using metadata. The proximity sensor 118b may detect objects within the surrounding environment of the vehicle 102 and their relative distance from the vehicle 102.

The one or more sensors 118 may include other sensors 118c. The other sensors 118c may include LIDAR, radar, infrared, or other signal to detect one or more objects within a proximity, such as threshold distance of approximately 10-15 feet, of the vehicle 102. The other sensors 118c may also differentiate features, characteristics or attributes of the objects, which may then be tagged or labelled using metadata, such as a sensor that performs object character recognition (OCR) or color or shape analysis.

The video surveillance platform 104 may include a microphone 120. The microphone 120 may capture audio data of the surrounding environment of the vehicle that corresponds to the image data captured by the camera 118a. The audio data may be captured, stored or provided along with the image data so that the user on the user device 106 is provided with both audio and visual data regarding the triggering event and/or the one or more objects determined to be of importance or determined to be meaningful.

The video surveillance system 100 may include or be coupled to one or more vehicle components. The one or more vehicle components may include a navigation unit 124. The navigation unit 124 may be integral to the vehicle 102 or a separate unit coupled to the vehicle 102. The vehicle 102 may include a Global Positioning System (GPS) unit (not shown) for detecting location data including a current location of the vehicle 102 and date/time information instead of the navigation unit 124. The current location of the vehicle 102 and/or the date/time information may be part of the metadata tagged or labeled to the one or more objects within the image data captured by the camera 118a. In some implementations, the ECU 112 may perform the functions of the navigation unit 124 based on data received from the GPS unit. The navigation unit 124 or the ECU 112 may perform navigation functions. Navigation functions may include, for example, route and route set prediction, providing navigation instructions, and receiving user input such as verification of predicted routes and route sets or destinations.

The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. The vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may supply electrical energy to and receive electrical energy from the motor and/or generator 126. The battery 130 may include one or more rechargeable batteries and may supply the power to the video surveillance system 100 even when the vehicle 102 is off.

The BMCU 132 may be coupled to the battery 130 and may control and manage the charging and discharging of the battery 130. The BMCU 132, for example, may measure, using battery sensors, parameters used to determine the state of charge (SOC) of the battery 130. The BMCU 132 may control the battery 130.

Figure 2:
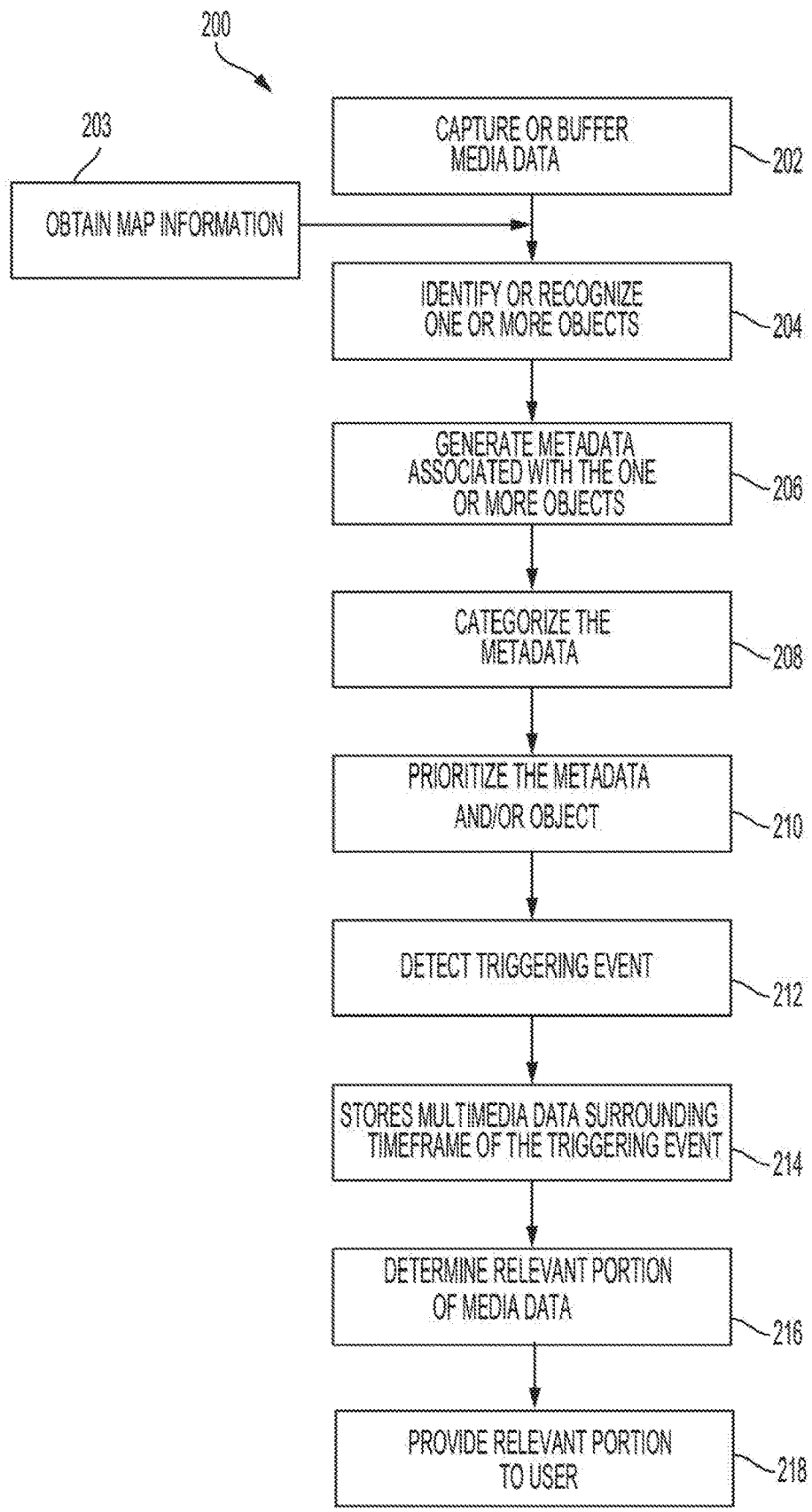
FIG. 2 is a flow diagram of an example process for providing a reduced media clip to a user device using the video surveillance system of FIG. 1 according to an aspect of the invention.

FIG. 2 is a flow diagram of a process 200 for providing a reduced media clip to a user device 106. One or more computers or one or more data processing apparatuses, for example, the ECU 112 of the video surveillance platform 104 of the video surveillance system 100 of FIG. 1, appropriately programmed, may implement the process 200.

The video surveillance platform 104 captures and/or buffers media data (202). The media data includes image data and/or audio data of the surrounding environment of the vehicle 102, such as within a threshold distance of approximately 10-15 feet of the current location of the vehicle 102. In some implementations the media data may include image data and/or audio data of the environment within the vehicle 102. The media data may refer to any media data, such as image data or the audio data, or may refer to combination of both the image data and the audio data. The video surveillance platform 104 may entail the analysis and processing of image data, such as video, audio data, such as audio, and/or a combination of both to form and generate the clip or reduced portion thereof to deliver or provide to the user device 106.

The video surveillance platform 104 may use the camera 118*a* to capture the image data and/or use the microphone 120 to capture the audio data. The video surveillance platform 104 may synchronize the captured and/or buffered media data so that the audio data corresponds with the image data that is captured.

The video surveillance platform 104 may continuously capture, buffer and/or stream the media data from the camera 118*a* and/or the microphone 120. The size of the buffer may be user-configured or be a predetermined size, such that the video surveillance platform 104 maintains an amount of media data, image data and/or audio data, within the buffer to analyze, process and/or store.

The video surveillance platform 104 may obtain map information of the surrounding environment of the vehicle 102 (203). The map information may include objects and their corresponding locations that are within a threshold distance of the vehicle 102. For example, the video surveillance platform 104 may obtain a current location of the vehicle 102 using the navigation unit 124 and provide the current location to a map database, such as one that resides on the remote storage 108, to obtain the map information. The map information may be used to assist in identifying objects within the media data.

As the media data is captured or buffered, the video surveillance platform 104 identifies or recognizes one or more objects within the media data, such as within the image data (204). The video surveillance platform 104 may frame or outline objects within the image data and compare the framed or outlined objects to library objects within a library of objects. When the video surveillance platform 104 matches the object to an object within the library of objects, the video surveillance platform 104 may identify the object as the library object. The library object may be associated with various features, attributes or other characteristics (hereinafter, referred to as "attributes"). For example, if the video surveillance platform 104 matches the object to a library object associated with a vehicle, the library object may have various attributes, such as color, make/model, year, LPN, type or other attribute(s) related to the vehicle.

In some implementations, the video surveillance platform 104 may use the map information to assist in identifying the one or more objects. The video surveillance platform 104 may determine that another vehicle, person or other object is nearby and identify which of the one or more objects is within the media data based on the locations of one or more objects provided within the map information. For example, if the map information indicates that another vehicle is in front of the vehicle 102, then the video surveillance platform 104 may correspond and identify the object that is in front of the vehicle 102 with the other vehicle indicated in the map information. These objects that are recognized or identified may be associated with various attributes unique to the object, as described above.

Once the one or more objects are identified or recognized, the video surveillance platform 104 generates metadata associated with the one or more objects (206). For each of the one or more objects, the video surveillance platform 104 generates metadata associated with the one or more objects. The metadata relates to the attributes of the one or more objects. The video surveillance platform 104 may analyze the media data, e.g., image data, and/or use other sensors 118*c* in combination with the camera 118*a* to determine or detect the attributes of the one or more objects. For example, the video surveillance platform 104 may process or analyze the image data to separate various colors within the image data and/or perform shape and/or object character recognition (OCR) within the image data to identify attributes of the one or more objects. The video surveillance platform 104 may use OCR to identify the LPN, a vehicle logo or other attribute, for example. In another example, the video surveillance platform 104 recognizes the shape of the vehicle and may identify the make/model of the vehicle based on the shape. In another example, sensor data may be captured, such as the relative speed or direction of the vehicle or other object along with a timestamp, to be used to generate metadata that is tagged and associated with the object.

Once the metadata is generated, the video surveillance platform 104 categorizes the metadata and tags or labels the metadata to the associated object within the media data (208). For each metadata associated with each object, the video surveillance platform 104 may categorize the metadata into various categories. The various categories may depend upon the type of object. For example, an object, such as a vehicle, may have categories for the metadata, such as a type, make, model, year, LPN, color or other attribute(s). The video surveillance platform 104 may categorize the metadata that indicates that the vehicle is red into the "color" category, the metadata associated with a Toyota into the "make" category and a Prius into the "model" category. Each of these categories may be weighted to determine a priority or importance related to the category. The video surveillance platform 104 may create an association between the categorized metadata with the object, i.e., and may tag or label the metadata with the object by appending the metadata to the image data representative of the object, for example.

Figure 3:
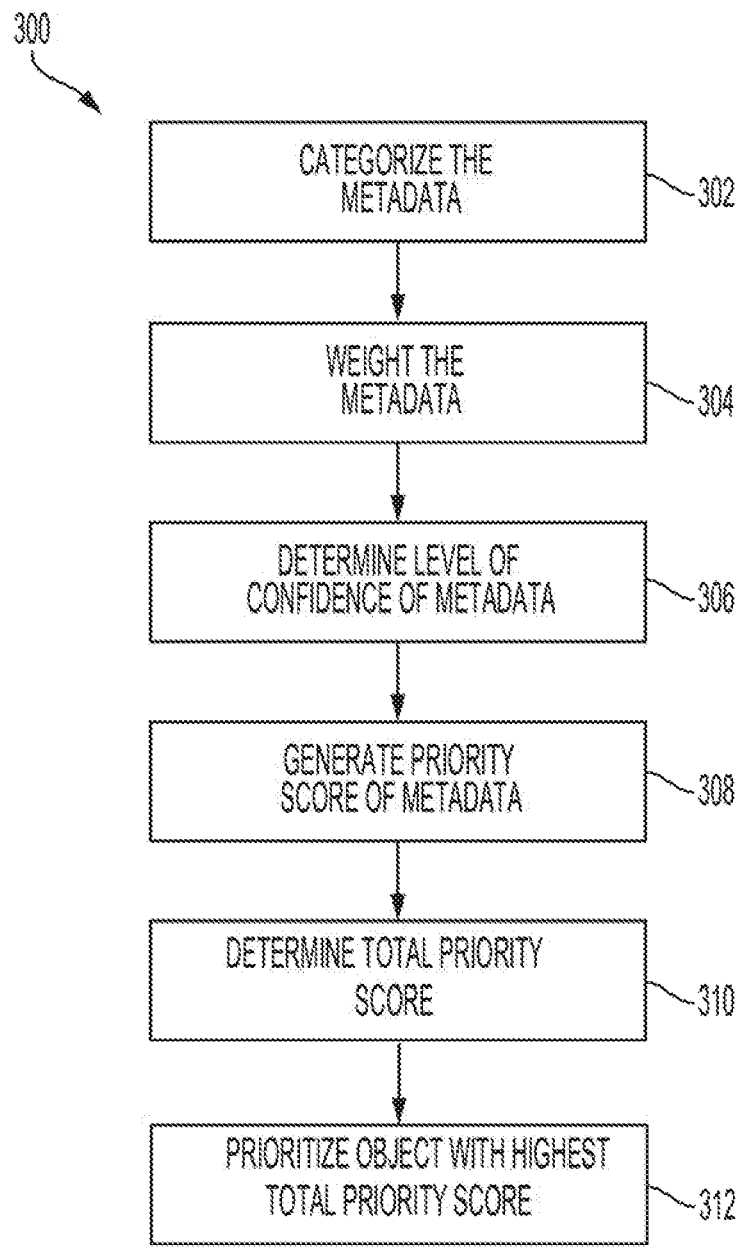
FIG. 3 is a flow diagram of an example process for prioritizing the one or more objects using the video surveillance system of FIG. 1 according to an aspect of the invention.

The video surveillance platform 104 prioritizes the metadata and/or the objects within the media data (210). The video surveillance platform 104 may prioritize the metadata associated with each of the one or more objects based on the categorization of the metadata and/or a level of confidence of the metadata. Once the metadata associated with each of the one or more objects is prioritized, the video surveillance platform 104 may generate a prioritization for the object based on the prioritization of the metadata associated with each of the one or more objects. The prioritization for the object may be based on the prioritization of the metadata from various categories and use a combination of the various metadata. For example, a priority score may be associated with the metadata and a total priority score may be calculated based on the priority score of the various metadata associated with the object. The total priority score may be a summation or other function of the priority score of the metadata associated with the object. FIG. 3 further describes the prioritization of the metadata and/or the objects within the media data.

The video surveillance platform 104 detects a triggering event (212). The triggering event is an event that indicates to the video surveillance platform 104 to record and store media data including the image data and/or audio data into the memory 114 and/or to provide to the user device 106. For example, the triggering event may be a collision or an impact of another vehicle, a person or other object coming within a threshold distance of the vehicle 102 or other event of importance that warrants informing or attention of the user of the user device 106.

Figure 4:
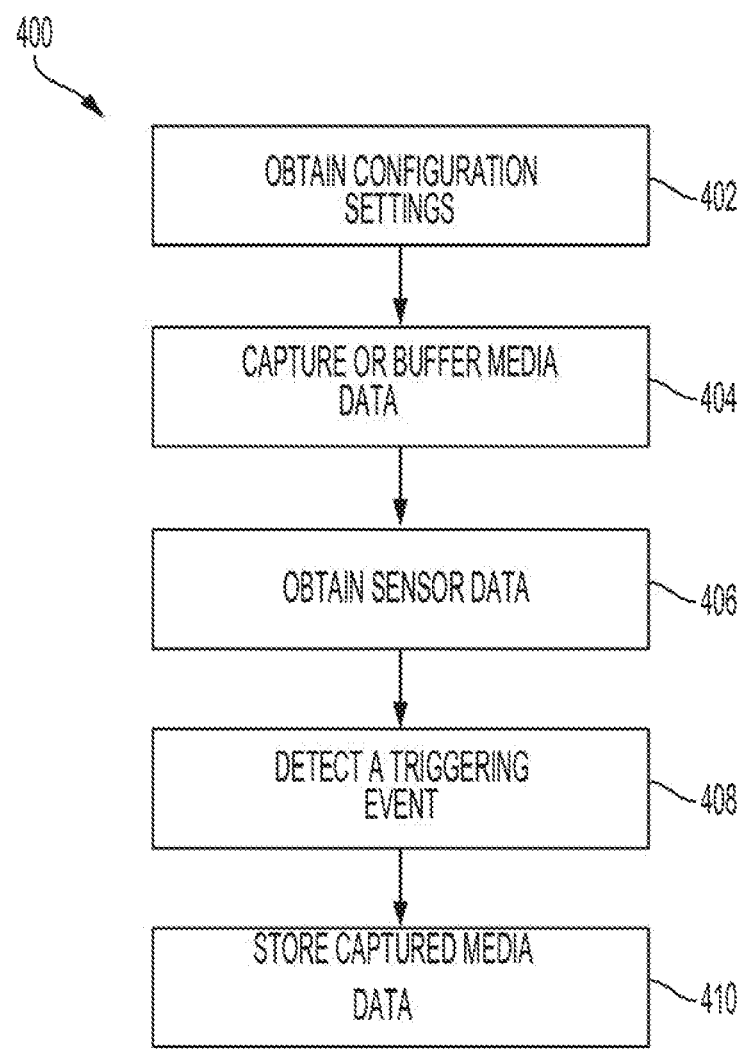
FIG. 4 is a flow diagram of an example process for detecting the triggering event using the video surveillance system of FIG. 1 according to an aspect of the invention.

The video surveillance platform 104 may use one or more sensors 118 to detect the triggering event. For example, a proximity sensor 118*b* or other sensors 118*c* may signal that another vehicle or person is within a threshold distance of the vehicle 102 and/or the other vehicle or person may impact or otherwise contact the vehicle 102. In some implementations, the video surveillance platform 104 may analyze the image data and determine that there is a triggering event based on the image data. For example, the camera 118a may capture that another vehicle is about to impact the vehicle 102 and determine that there is a triggering event. FIG. 4 further describes the detection of the triggering event to generate the reduced portion of the media data.

Once the triggering event is detected, the video surveillance platform 104 stores the media data surrounding the timeframe of the triggering event (214). The video surveillance platform 104 may store the media data into the memory 114. The stored media data may be that of the media data that was captured or streamed a period before and a period after the triggering event. This assists the video surveillance platform 104 in identifying key objects and/or characteristics of the key objects that triggered the triggering event.

The period before, such as approximately 20-30 seconds before the triggering event, and the period after, such as approximately 20-30 seconds after the triggering event, may be determined by user input entered via the user interface 122, and/or one or more configuration settings obtained from the memory 114. Thus, media data before and after the triggering event is captured and stored to determine the relevant information within the media data. By storing the media data before and after the triggering event, the video surveillance platform 104 may identify the object that caused the triggering event, such as the person breaking into the vehicle 102 or the other vehicle hitting the vehicle 102, and subsequently, the video surveillance platform 104 may identify the consequences of the triggering event, such as the other vehicle leaving the scene of the accident or the items that the person stole from the vehicle 102.

The video surveillance platform 104 identifies or determines the relevant portions of the media data to send (216). The relevant portions of the media data are a subset, a portion or a clip of the media data (hereinafter referred to as "media clip") that was captured and stored for the duration before and after the triggering event. That is, the media clip has a shorter or reduced length, a lesser size and/or a decreased resolution of the media data that was captured and/or stored and may be only a portion of the media data that was captured and/or stored.

The relevant portions of the media data may be based on the prioritization of the metadata and/or objects within the media data that were captured and stored. Since the media clip is a subset or portion of the media data that was captured and stored, the media clip uses less memory resources and data transmission resources to send and provide the media clip to the user device 106. The media clip may be a reduced portion, such as a reduced length or size, of the media data and/or may be a lower resolution capture of the media data. The relevant portions may include media clips of both inside and/or outside of the vehicle 102 and include the metadata that has been tagged to the one or more objects within the relevant portions.

In some implementations, the video surveillance platform 104 may determine the relevant portion based on the number of metadata that are tagged and associated with each of the one or more objects. The video surveillance platform 104 may count or otherwise keep track of the number of metadata that are tagged and associated with each of the one or more objects and determine that the most relevant portion has the most tagged and associated metadata. In some implementations, the video surveillance platform 104 may use a combination of the number of metadata and the prioritization to determine the most relevant portions.

Once the media clip is generated, the video surveillance platform 104 sends or provides the relevant portion to a user (218). The video surveillance platform 104 may send or provide the media clip via the network access device 116 through the network 110 to a user device 106 and may include one or more media clips taken from inside and/or outside the vehicle 102. In some implementations, the video surveillance platform 104 may send or provide the relevant portion to the remote storage 108 or other database, web server, or other third-party, such as the police or insurance company. This allows the user device 106 or other device to render the media clip and the user to watch and/or listen to the media clip. The media clip provides the most meaningful, important and/or relevant portions of the media to the user while minimizing the amount of resources necessary to store and transmit the relevant content.

FIG. 3 is a flow diagram of a process 300 for prioritizing the one or more objects within the media data. One or more computers or one or more data processing apparatuses, for example, the ECU 112 of the video surveillance platform 104 of the video surveillance system 100 of FIG. 1, appropriately programmed, may implement the process 300.

The video surveillance platform 104 categorizes the metadata for each of the one or more objects within the media data, as described above (302). Once the metadata is categorized, the video surveillance platform 104 assigns a weight to each category of the metadata (304). The weight assigned to each category may be representative of the importance of the category when determining the relevancy of the attribute associated with the metadata. A higher weight may be associated with a greater relevance or importance to identifying the object. A lower weight may be associated with a lesser relevance or importance to identifying the object.

For example, a category of metadata, such as the LPN of a vehicle, may be more relevant than the category of metadata for the color, make or model of the vehicle because the LPN is more unique in identifying the vehicle than the color, make or model of the vehicle, and thus, the LPN category may be weighted more than the color, make or model category. In another example, a category of metadata, such as an identifying mark including a tattoo, on an individual may be more relevant than the category for the height or build of the individual, and thus, the identifying mark category may be weighted greater than the height or build category for the individual.

The video surveillance platform 104 may determine the level of confidence of the metadata associated with each of the one or more objects (306). The level of confidence of the metadata may indicate the confidence or probability that the identified attribute is recognized accurately. The video surveillance platform 104 may measure or detect the accuracy of correctly identifying the attribute associated with the metadata, such as based on the clarity of the image data and/or the lack of noise within the image data. For example, the video surveillance platform 104 may assess the accuracy that the video surveillance platform 104 was able to perform object character recognition when identifying the LPN. The accuracy may be based on the fidelity of the media data, such as the amount of noise within the image data and/or the amount of noise within the audio data that needs to be filtered, to identify the attribute from the media data. The greater the amount of noise within the media data the lesser the accuracy, which decreases the level of confidence for the attribute. Similarly, the less the amount of noise within the media data, the greater the accuracy, which increases the level of confidence for the attribute. Other factors may be considered when determining the level of confidence, such as the distance the object is away from the camera 118a, the microphone 120 or other sensors 118c, the angle of the field-of-view of the camera 118a and/or other interference, such as weather, that may impede the capture of the media data.

Once the categories are weighted and the level of confidence is determined for the metadata, the video surveillance platform 104 may generate the priority score for the metadata (308). The priority score may be a function of the weight of the metadata and the level of confidence of the metadata. The priority score may be associated with each metadata of the one or more objects within the surrounding environment of the vehicle 102. For example, the level of confidence of the metadata may be assigned a score or value. As the level of confidence increases, the score assigned may also increase, and as the level of confidence decreases, the score assigned may also decrease. Once a score is assigned to the level of confidence, the video surveillance platform 104 may generate the priority score based on the score or value representative of the level of confidence of the metadata and the weight of the metadata. For example, the weight may be multiplied by the score or value representative of the level of confidence to determine the priority score associated with the metadata.

The video surveillance platform 104 determines the total priority score of each of the one or more objects (310). The total priority score represents both the relevancy and accuracy of the one or more objects and may be based on each priority score of each metadata associated with each of the one or more objects. The video surveillance platform 104 may sum each of the priority scores for each metadata that corresponds to each object or perform another function on the priority scores to obtain the total priority score of each object.

Once the video surveillance platform 104 determines the total priority score for each of the one or more objects, the video surveillance platform 104 may prioritize or select the object with the highest total priority score to focus on to form the relevant portion of the media data (312). This allows the video surveillance platform 104 to identify the object among all the objects in the environment that is the most important and/or has the most accurate information available to identify the object. For example, after detecting the triggering event, the video surveillance platform 104 may focus on the other vehicle that hit the vehicle 102 rather than a biker when generating the relevant portions of the media data. This may be because the metadata that identifies the LPN of the vehicle has a high level of confidence. e.g. is very clearly visible, and/or has a high weight, e.g., because the LPN is of great importance or relevance in identifying the vehicle. Whereas, the metadata that identifies the biker has a low level of confidence, e.g., because the face of the biker is not visible due to clothing, and/or has a low weight, e.g., because the color of the biker's clothing is of low importance or relevance in identifying the biker.

FIG. 4 is a flow diagram of a process 400 for detecting the triggering event. One or more computers or one or more data processing apparatuses, for example, the ECU 112 of the video surveillance platform 104 of the video surveillance system 100 of FIG. 1, appropriately programmed, may implement the process 400.

The video surveillance platform 104 may obtain one or more configuration settings (402). The one or more configuration settings indicate the amount of time before and the amount of time after a triggering event to record and store the media data. The amount of time before and the amount of time after may be user-configured, user-inputted and/or pre-configured. In some implementations, the amount of time before and the amount of time after may be a default timeframe and/or set at the factory.

The video surveillance platform 104 continuously captures and/or buffers media data, as described above (404). While the video surveillance platform 104 captures and/or buffers the media data, the video surveillance platform 104 obtains sensor data and/or analyzes the media data (406). The video surveillance platform uses the one or more sensors 118, such as the proximity sensor 118b, to obtain the sensor data. The sensor data may include a relative distance of one or more objects within a threshold distance of the vehicle 102 and/or other attributes or characteristics of the one or more objects, such as a relative speed and/or direction. The video surveillance platform 104 may analyze the media data to determine the relative distance, relative speed and/or direction or other characteristics of the one or more objects.

The video surveillance platform 104 detects the triggering event (408). The video surveillance platform 104 may detect the triggering event based on the sensor data and/or the analysis of the media data. The triggering event may be caused when an object presents a hazard to the vehicle 102 or to the occupants within the vehicle 102 and/or the when the object acts unusually or suspiciously, e.g., when the behavior of the object is different than a baseline. For example, when the relative distance of the object is less than a threshold distance, such as within a foot of the vehicle 102, the video surveillance platform 104 may determine that there is a triggering event to cause the video surveillance platform 104 to record and store the media data. In another example, when the object behaves differently than a baseline or expected behavior, such as when the video surveillance platform 104 identifies that a person is swinging or throwing an object toward the vehicle 102, the video surveillance platform 104 may determine that there is a triggering event. Once the video surveillance platform 104 detects the triggering event, the video surveillance platform 104 stores the captured media data, as described above (410).

Figure 5:
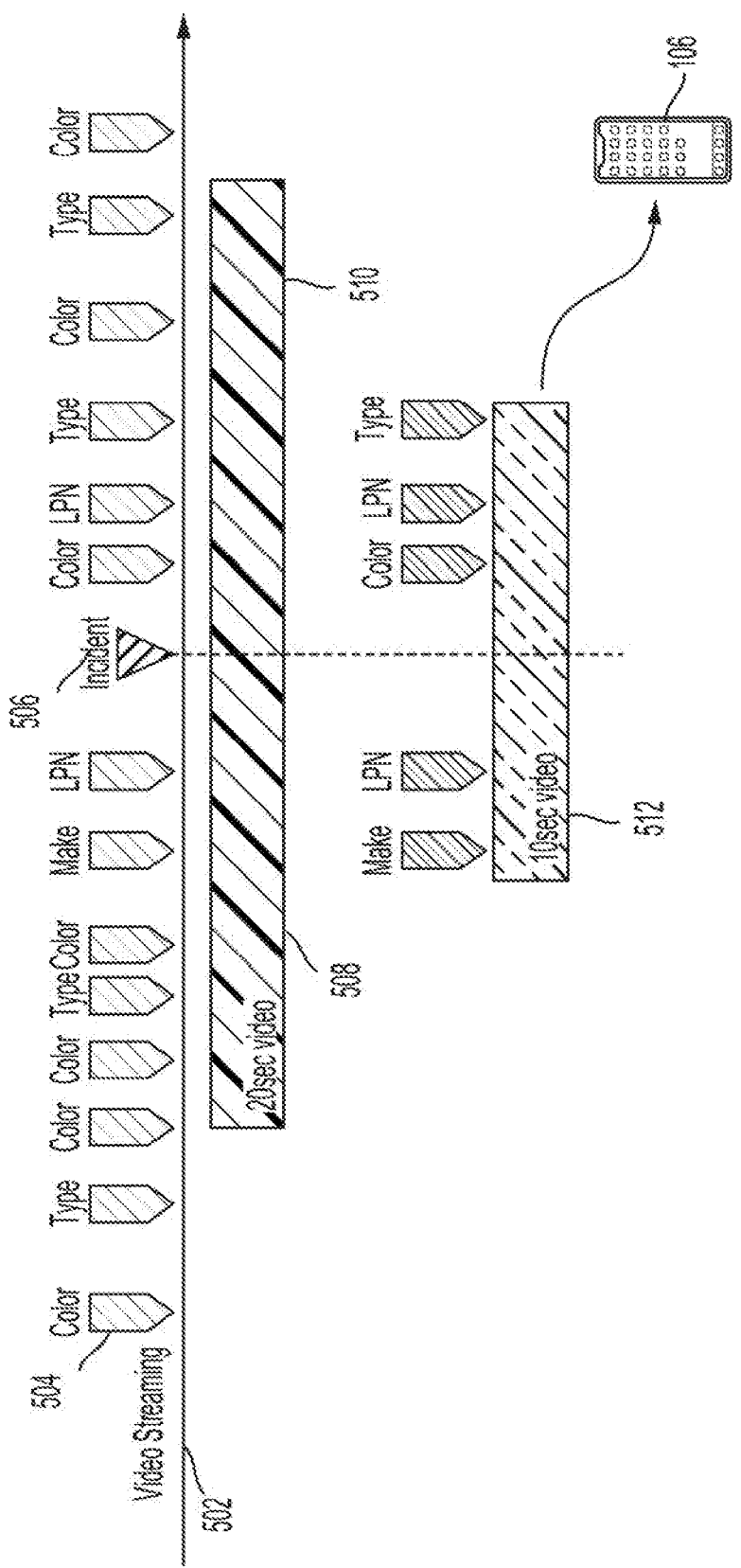
FIG. 5 shows the generation and delivery of the media clip using the video surveillance system of FIG. 1 according to an aspect of the invention.

FIG. 5 shows a graphical representation of generating and providing the reduced media clip to a user device 106. The video surveillance platform 104 captures or buffers the media data, such as the video stream 502, in real-time. As the video surveillance platform 104 captures or buffers the media data, the video surveillance platform tags or labels the metadata 504 for the one or more objects identified or recognized within the media data. The video surveillance platform 104 may categorize the metadata while the media data is captured or buffered. The video surveillance platform 104 detects a triggering event 506 and records or stores the media data during a period 508 before the triggering event 506 and a period 510 after the triggering event 506. The video surveillance platform 104 prioritizes the metadata and/or the one or more objects within the recorded or stored media data. The prioritization identifies the one or more objects of the most relevance and with the highest level of accuracy so that the video surveillance platform 104 may determine the most relevant portion of the stored media to provide to the user device 106. The video surveillance platform 104 generates a media clip, such as the video clip 512, which is a subset or a portion of the recorded or stored media data that represents the most relevant portion of the media data to provide to the user device 106. The media clip may focus on the one or more objects of greatest importance and/or may be most accurately identified. The most relevant portion may be identified based on the prioritization of the metadata and/or one or more objects.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A video surveillance system, comprising:
a camera configured to detect image data;
a memory configured to store media data that includes the image data; and
a processor coupled to the camera and the memory and configured to:
identify one or more objects within the image data,
generate metadata associated with the one or more objects within the image data,
prioritize the metadata associated with the one or more objects based on a level of confidence of the metadata indicating a probability that an attribute of the metadata is recognized accurately for each of the one or more objects,
tag the metadata to the one or more objects within the image data, and
generate a media clip that is a portion of the media data based on at least one of the metadata tagged to the one or more objects or the prioritization of the metadata.

2. The video surveillance system of claim 1, wherein the processor is configured to:
provide the media clip to a user device, wherein the media clip has a length that is shorter than a length of the media data and has a reduced data size that is less than a data size of the media data.

3. The video surveillance system of claim 1, wherein the processor is configured to:
categorize the metadata associated with the one or more objects into a plurality of categories.

4. The video surveillance system of claim 3, wherein to prioritize the metadata associated with the one or more objects the processor is configured to:
weight each category of the plurality of categories; and
prioritize the metadata associated with the one or more objects using the weight of the respective category of the metadata associated with the one or more objects.

5. The video surveillance system of claim 1, wherein the processor is configured to:
determine the level of confidence based at least on an amount of noise within the image data; and
generate the media clip based on the metadata tagged to the one or more objects and the prioritization of the metadata.

6. The video surveillance system of claim 1, wherein the processor is configured to:
determine that there is a triggering event; and
wherein the portion of the media data includes data which was captured or streamed during a period of time before and a period of time after the triggering event.

7. A video surveillance system for a vehicle, comprising:
a camera configured to detect image data;
a sensor configured to detect a triggering event;
a memory coupled to the camera and the sensor and configured to store media data that includes the image data; and
an electronic control unit coupled to the camera and the memory and configured to:
identify one or more objects within the image data,
generate metadata associated with the one or more objects within the image data,
prioritize the metadata associated with the one or more objects based on a level of confidence of the metadata indicating a probability that an attribute of the metadata is recognized accurately for each of the one or more objects,
tag the metadata to the one or more objects within the image data, and
generate a media clip that is a portion of the media data based on at least one of the metadata tagged to the one or more objects or the prioritization of the metadata and in response to the triggering event.

8. The video surveillance system of claim 7, wherein the electronic control unit is configured to:
provide the media clip to a user device, wherein the media clip has a length that is shorter than a length of the media data and has a reduced data size that is less than a data size of the media data.

9. The video surveillance system of claim 7, wherein the electronic control unit is configured to:
categorize the metadata associated with the one or more objects into a plurality of categories.

10. The video surveillance system of claim 9, wherein to prioritize the metadata associated with the one or more objects the electronic control unit is configured to:
weight each category of the plurality of categories; and
prioritize the metadata associated with the one or more objects using the weight of the respective category of the metadata associated with the one or more objects.

11. The video surveillance system of claim 7, wherein the processor is configured to:
determine the level of confidence based at least on an amount of noise within the image data; and
generate the media clip based on the metadata tagged to the one or more objects and the prioritization of the metadata.

12. The video surveillance system of claim 7, wherein the electronic control unit is configured to:
determine the triggering event based on data detected by the sensor; and
store or record the portion of the media data from a period of time before and a period of time after the triggering event to generate the media clip.

13. A method of video surveillance, comprising:
capturing, by a processor and using a camera, media data including image data of an environment surrounding a vehicle;
identifying, by the processor, one or more objects within the image data;
generating, by the processor, metadata associated with each of the one or more objects within the image data;
prioritizing, by the processor, the metadata associated with the one or more objects based on a level of confidence of the metadata indicating a probability that an attribute of the metadata is recognized accurately for each of the one or more objects;

tagging, by the processor, the metadata to the one or more objects within the image data; and generating, by the processor, a media clip that is a portion of the media data based on at least one of the metadata tagged to the one or more objects or the prioritization of the metadata.

14. The method of claim 13, wherein the media data includes audio data, wherein the image data is a video and the media clip includes a video clip of the video, and wherein a length of the video clip is less than a length of the video.

15. The method of claim 14, further comprising:
providing the video clip to a user device.

16. The method of claim 13, wherein generating the media clip comprises:
generating the media clip based on the metadata tagged to the one or more objects and the prioritization of the metadata associated with each of the one or more objects.

17. The method of claim 13, further comprising:
categorizing the metadata associated with each of the one or more objects into a plurality of categories.

18. The method of claim 13, wherein generating the media clip that is the portion of the media data is triggered in response to determining, by the processor, that a person or another vehicle is within a threshold distance of the vehicle.

* * * * *